April 20, 1926.  1,581,807

R. KOLARIK ET AL

COMBINED TIRE CARRIER AND RIM EXPANDING TOOL

Filed Oct. 16, 1922   2 Sheets-Sheet 1

INVENTORS.
Ralph Kolarik
John C. Wendling
Emil M. Bahnik
David A. Davies,
BY
Baker & Macklin, ATTYS April 20, 1926.
R. KOLARIK ET AL
1,581,807
COMBINED TIRE CARRIER AND RIM EXPANDING TOOL
Filed Oct. 16, 1922    2 Sheets-Sheet 2
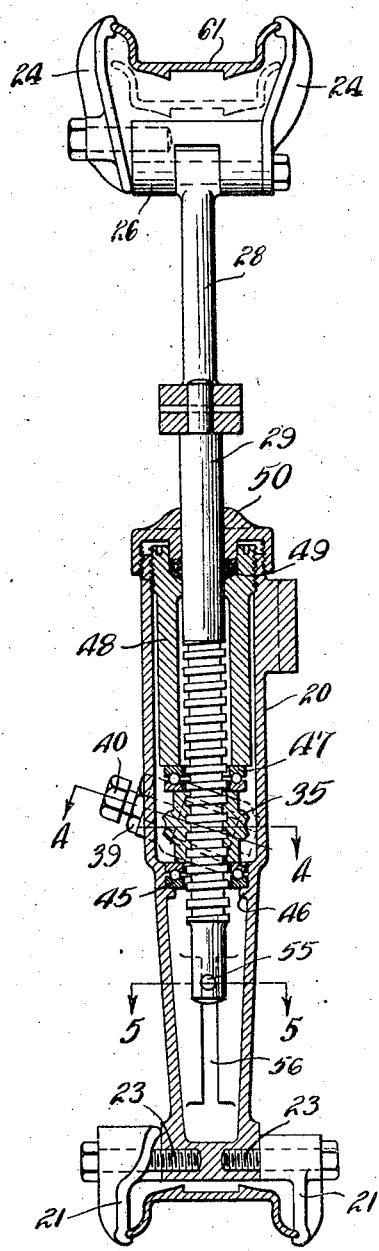
Fig.-3
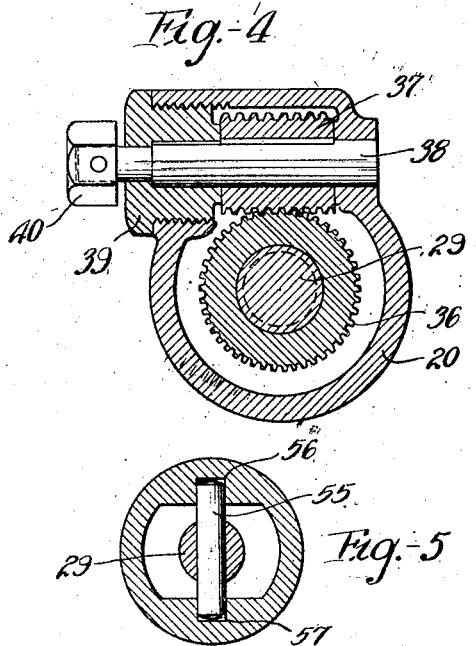
Fig.-4
Fig.-5
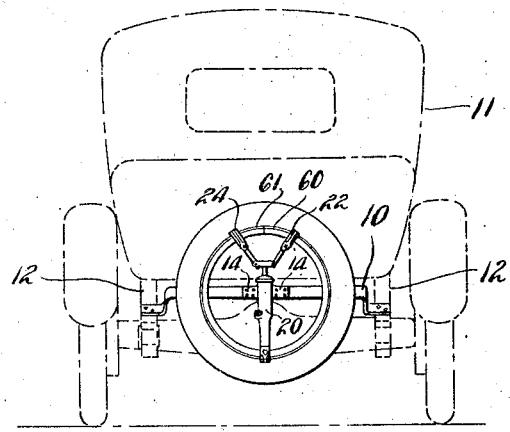
Fig.-6
INVENTORS
Ralph Kolarik,
John C. Wendling,
Emil M. Bahnik
David A. Davies,
BY
Baker Moedin ATTYS Patented Apr. 20, 1926.

1,581,807

UNITED STATES PATENT OFFICE.

RALPH KOLARIK, JOHN C. WENDLING, EMIL M. BAHNIK, AND DAVID A. DAVIES, OF CLEVELAND, OHIO.

COMBINED TIRE CARRIER AND RIM-EXPANDING TOOL.

Application filed October 16, 1922. Serial No. 594,724.

*To all whom it may concern:*

Be it known that we, RALPH KOLARIK, JOHN C. WENDLING, EMIL M. BAHNIK, and DAVID A. DAVIES, citizens of the United States, residing at Cleveland, county of Cuyahoga, and State of Ohio, have invented a certain new and useful Improvement in Combined Tire Carriers and Rim-Expanding Tools, of which the following is a full, clear, and exact description, reference being had to the accompanying drawings.

A procedure in removing a tire from a rim is to lay the rim flat upon the ground or floor and then to employ suitable tools for disengaging the abutting ends of the rim. Similarly, in placing the tire upon a rim, the reverse procedure is followed, but much difficulty is experienced in collapsing and also in expanding the rim, not only on account of the inherent characteristics of the metal, but also because of the fact that when the rim is upon the ground, the operator is placed at a disadvantageous position for using the rim expanding tool.

Accordingly, one of the objects of our invention is to provide a rim-expanding tool which is well adapted for permanent connection to an automobile whereby the actuating mechanism is readily accessible to the operator. Our invention includes a tool of this character which, while attached to the vehicle is thus adapted for carrying a spare tire.

Another object of our invention is the provision of a rim expanding tool which is so constructed that one end of the rim may be readily detached from the other end thereof without necessitating additional means for separating the ends after tension is placed upon the rim. In this connection, our invention provides a tool which is quite simple in construction, neat in appearance and capable of being cheaply made.

The means for carrying out our invention as embodied in the preferred form of tool is hereinafter fully set forth in the following description, which pertains to the accompanying drawings. The essential features of our invention are summarized in the claims.

Figure 1:
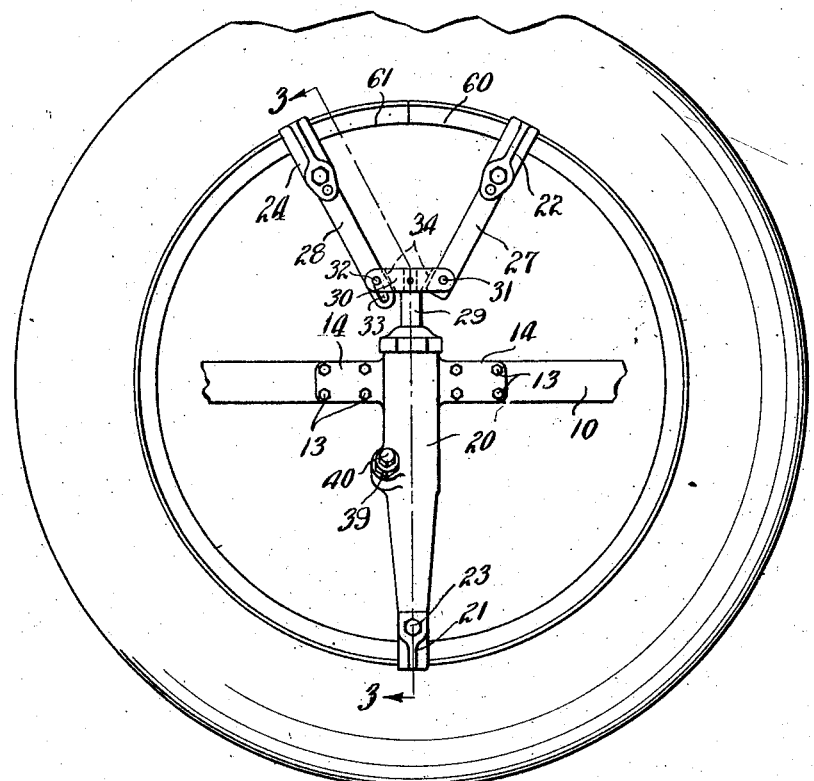
Figure 2:
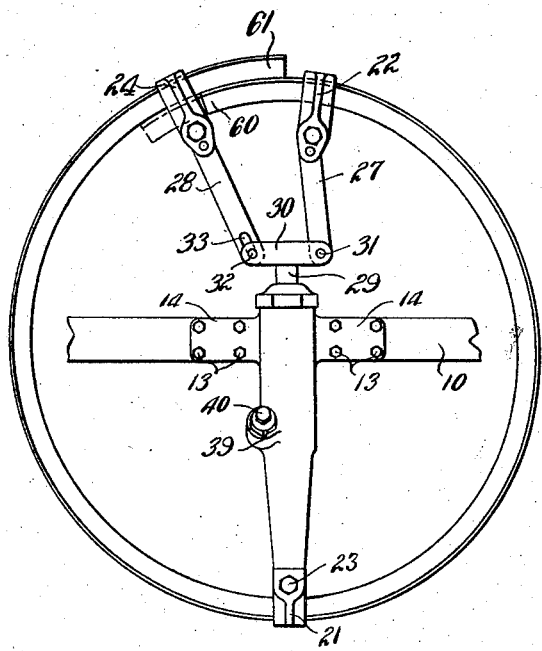

In the drawings, Fig. 1 is an elevation of a rim expanding tool and tire carrier constructed according to our invention; Fig. 2 is a view similar to that shown in Fig. 1 and indicating the rim in collapsed position; Fig. 3 is a section taken on the corresponding lines in Fig. 1 and showing part of the mechanism in elevation; Figs. 4 and 5 are sections taken on corresponding lines in Fig. 3 and showing part of the mechanism in elevation; Fig. 6 shows diagrammatically the rear view of an automobile having our invention attached thereto.

One of the features of our invention as heretofore stated, comprises the mounting of a rim expanding tool upon an automobile, whereby such tool functions as a carrier for spare tires. To this end, however, any form of expanding tool which engages a rim may be employed, but in the drawings, we have illustrated a form of tool which will be hereinafter described.

To support the tool, we have shown a bar 10 which extends across the rear of an automobile 11 and is attached to the chassis side bars 12. The tool is preferably permanently attached to the bar, as by securing members 13, which extend through a pad 14 forming part of the rim tool. The construction of the tool illustrated will now be described.

As shown in Fig. 1, the tool embodies preferably three arms which are provided with suitable clamps for engaging a rim at separated points. One of the arms is shown as a housing 20 which comprises a hollow casting having the pads 14 formed intergral therewith, whereby the tool may be rigidly attached to some part of the motor vehicle. This housing carries rim clamps 21 which may be suitably held by securing members 23.

The remaining rim engaging members are illustrated as clamps 22 and 24 which are arranged to be attached by securing members similar to those indicated at 23, to pivot blocks 26. Each of these blocks may comprise a bifurcated member which is pivotally connected to one of the arms, as at 27 and 28 respectively.

To attach the arms 27 and 28 to the arm 20, we have illustrated a member 29 as a threaded spindle extending partially within the housing 20. This spindle may be connected to the arms by a transversely extending head 30, the ends of which are forked to receive the arms 27 and 28. The bar 27 is shown pivotally mounted on the spindle, as at 31, while the bar 28 is illustrated as having a lost motion connection therewith by means of a pin 32 and slot 33. The inner wall of the forked ends, as at 34, is inclined to the sides of the head, as shown particularly in Fig. 1 to prevent the arms from falling downwardly when the rim is removed from the tool. This facilitates the replacement of a rim since the arms are always maintained in receiving position.

The means for operating the tool to collapse or expand a rim, is illustrated as a screw and nut couple, one member of which comprises the threaded spindle 29, and the other member of which comprises an internally threaded nut 35. The exterior of the nut, as shown in Fig. 4, has worm wheel teeth 36 which are shaped for engagement with a worm 37. The worm may be supported on a shaft 38, one end of which is journaled in the housing 20, and the other end of which carries a sleeve 39. This sleeve may be threaded to the housing so as to provide a lubricant-tight joint therewith. To rotate the worm, we have shown a nut 40 rigidly attached to the shaft 38 outside the sleeve 39. The nut is the same size as those usually employed for holding the rim to the felloe of a wheel, thus permitting the worm to be readily turned by the means usually employed for removing the rim fastening nuts.

The worm is mounted preferably below the pads 14, thus providing a convenient and accessible location for actuating the collapsing or expanding mechanism. Accordingly, to retain the nut 35 in mesh with the worm, we have shown a lower bearing 45 which engages a shoulder 46 on the housing, and an upper bearing 47 which may be positioned by a sleeve 48 extending into the housing and in threaded engagement therewith. The upper end of the sleeve is adapted to receive suitable packing 49 which may be held in place by the usual follower 50 whereby the chamber within the housing may be filled with grease and may be protected against water which is apt to enter the housing between the spindle and sleeve 48.

The spindle is prevented from rotating preferably by means of a pin 55 which extends transversely through the spindle and moves in guideways 56 and 57 which may be cast in the housing. Since the spindle is prevented from rotating, then actuation of the spindle applies force or power directly to the arm 27 through the pivotal connection 21. The lost motion connection between the spindle and the arm 28, however, prevents the immediate application of power in accordance with the location of the pin 32 in the slot 33 when power is applied. The object of this lost motion connection is to permit one end of the rim to be drawn inwardly to clear the other end, thus enabling the joint to be broken without the necessity of forcing one rim end beneath the other.

Assuming that a tool constructed according to our invention is rigidly attached to an automobile and that a rim is clamped to such tool; then to collapse the rim, the nut 40 is rotated, whereby rotation is imparted to the nut 35 through the worm and worm wheel connection. Thus the spindle 29 is drawn into the housing 20. Assuming further, then, that the tool was in the position indicated in Fig. 1, which of course, is the usual position, after the rim has been expanded, then upon initial movement of the spindle, the arm 27 is thrown downwardly while the pin 32 moves through the slot 33 without imparting any motion to the arm 28. The slot 33 is of such length that the joint between the ends 60 and 61 is broken before the pin 32 reaches the end of the slot. As soon as the joint is broken, a continued downward movement of the spindle draws the clamps 22 and 24 toward each other, whereby the rim is contracted. Upon continued movement of the spindle one end of the rim, as at 60, is drawn beneath the other end until it slides through the space between the rim and clamps 24. This is illustrated in dotted lines in Figs. 2 and 3.

Assuming then, that it is desired to replace the tire on the rim and to expand the rim, then the nut 40 is turned in a reverse direction, thus tending to raise the spindle 29. The spindle is raised and the rim is expanded until the lost motion between the head and arm 28 is taken up whereupon the force is divided equally between the arms 27 and 28. Since these arms are prevented from moving downwardly by the inclined walls 34 in the head and furthermore since the jaws 22 and 24 are clamped to the rim, then it follows that the ends of the rim are forced outwardly until they clear each other. When such clearance is effected, the ends snap into abutting engagement wherefore replacement of the tire is effected.

Thus it will be seen that our invention embodies a novel combination of a spare tire carrier and rim tool expander. The construction of the tool itself, as illustrated, embodies rigid connections between the rim and jaws, which permit one end of the rim to be sprung past the other end without necessitating the use of additional means for breaking the rim joint. In addition, a tool of this character may be readily actuated by the tools usually employed for removing rim fastening nuts, thus permitting the manipulation of the rim in a satisfactory manner.

We claim:
1. A tool of the character described, comprising in combination three arms adapted to engage a rim, each of the arms having rim engaging clamps carried thereby, two of the arms being movable relatively to the third, and mechanism adapted by one continuous movement to move one of the movable arms alone to break the joint, and thereafter to move that movable arm and the other movable arm simultaneously to collapse the rim.

2. In combination, a rim expanding tool comprising spaced members adapted to engage a rim at separated points, said member being connected adjacent the central portion of the rim, and means for actuating said members to expand or collapse a rim, one of said members having a lost motion connection with the other members, whereby one end of the rim may be moved relatively to the other end upon actuation of said means.

3. In a device of the character described, the combination with a hollow housing, of a threaded spindle therein, means for connecting said housing to a collapsible rim, a pair of rim engaging members pivoted to said spindle outside said housing, one of said pivotal connections comprising a lost motion connection whereby one end of a rim may be moved past the other end upon actuation of said spindle and a worm and worm wheel connection within said housing for actuating said spindle.

4. In combination, a plurality of members adapted to engage a rim at separated points, one of said members being stationary with relation to the rim, and the other of said members being movable, a screw and nut couple within the stationary member for operating the movable member, one of said movable members having a lost motion connection with one of the members of said couple, whereby one end of a rim may be moved past the other end upon actuation of said couple.

5. In a tool of the character described having in combination, a housing, a threaded spindle movable longitudinally of the housing, worm and worm wheel connections for operating the spindle, said connections being enclosed within the housing, a transverse member attached to the spindle outside the housing, an arm pivotally supported on opposite ends of said member, and rim engaging clamps carried by said arms.

6. A tool of the character described having in combination a hollow casing, a spindle movable longitudinally of the casing, means for clamping said casing to a rim, a pair of arms pivotally supported on the spindle, rim engaging clamps pivotally mounted on each arm, and mechanism associated with the casing for operating said spindle.

7. A tool of the character described, comprising in combination, a housing open at one end and closed at the other, rim engaging clamps attached to the closed end, a threaded spindle extending within the housing and projecting through the open end thereof, mechanism within the housing for moving the spindle relatively to the housing, a cap embracing the spindle and attached to the housing, a pair of arms pivotally connected to said spindle, and rim engaging clamps carried by each arm, one of said arms having a lost motion connection with said spindle, whereby actuation of the spindle actuates one of said arms to the exclusion of the other for a predetermined distance for collapsing a rim.

8. A tool of the character described comprising in combination, a housing open at one end and closed at the other, rim engaging clamps removably secured to the closed end of said housing, a spindle reciprocable within the housing and projecting therebeyond, an arm pivotally connected to the spindle outside the housing, rim engaging clamps carried by said arm, means within the housing for actuating said spindle, and means for closing the open end of the housing to provide a lubricant chamber.

9. In a tool of the character described, the combination with a plurality of spaced arms each adapted to extend approximately radially of a rim and each having rim engaging members carried thereon, one of said arms comprising a hollow member having an offset chamber, a worm rotatably supported in the chamber, and a screw and nut couple for moving one of said arms relatively to the other, one of the members of said couple comprising a worm wheel in mesh with said worm.

10. A tool of the character described comprising three arms adapted to engage a rim at separated points, one of said arms being stationary and the other two movable, a member reciprocable within the stationary arm, means for pivotally connecting one of the movable arms with the stationary arm, and a lost motion connection between said member and the other of said movable arms.

11. In combination, three arms adapted to engage a rim at separated points, one of the arms being stationary and the other two movable, the stationary arm comprising a housing, a spindle having a threaded portion within the housing and projecting therebeyond, a nut rotatably threaded on the spindle and having worm wheel teeth on the periphery thereof, a worm supported within the housing and engaging said teeth, a closure embracing the spindle, and means for pivotally connecting the movable arm to said spindle outside the housing.

12. A tool of the character described comprising in combination, a stationary arm and a movable arm, a member reciprocable within the stationary arm, a head carried by the member and having one end thereof bifurcated, means for pivotally connecting the movable arm within the bifurcated portion, and means associated with the head for preventing the movable arm from swinging beyond a predetermined position relatively to the stationary arm, whereby the arms may be in proper position for receiving a rim when the tool is positioned upon a vertical support.

13. A tool of the character described, comprising in combination, three arms, each having clamps for attachment to the flange of a collapsible rim, two of the arms being movable relatively to the third, the stationary arm being clamped opposite the rim joint and the movable arm being clamped on opposite sides of the rim joint, means associated with the stationary arm for operating the movable arm, said means including a lost motion connection whereby the joint may be automatically broken when the rim is collapsed.

14. A tool of the character described, comprising in combination, three arms, two being movable relatively to the third, each of said arms having rim engaging clamps carried thereby, and a single mechanism for actuating both movable arms, said mechanism being so arranged that one movable arm may be moved thereby independently of the other movable arm to break the joint, after which both movable arms may be moved thereby simultaneously to contract the rim.

15. A tool of the character described, comprising in combination, three arms adapted to engage a rim, two of the arms being disposed on opposite sides of the rim joint, and mechanism for moving only one of said two arms a predetermined distance to break the rim joint during the collapsing operation, and means whereby the same mechanism may thereafter move both of said two arms simultaneously.

In testimony whereof, we hereunto affix our signatures.

RALPH KOLARIK.
JOHN C. WENDLING.
EMIL M. BAHNIK.
DAVID A. DAVIES.